United States Patent [19]

Ohashi

[11] Patent Number: 5,659,763
[45] Date of Patent: Aug. 19, 1997

[54] APPARATUS AND METHOD FOR REDUCING POWER CONSUMPTION BY PERIPHERAL DEVICES BY CONTROLLING THE INTERCONNECTION OF POWER SUPPLIES

[75] Inventor: Shinichiro Ohashi, Hyogo-ken, Japan

[73] Assignee: Mitsubishi Denki Kabushiki Kaisha, Tokyo, Japan

[21] Appl. No.: 751,275

[22] Filed: Nov. 18, 1996

Related U.S. Application Data

[63] Continuation of Ser. No. 511,765, Aug. 7, 1995, abandoned, which is a continuation of Ser. No. 822,502, Jan. 17, 1992, abandoned.

[30] Foreign Application Priority Data

Jan. 18, 1991 [JP] Japan .................................. 3-018424

[51] Int. Cl.$^6$ .................................................. G06F 1/32
[52] U.S. Cl. ............... 395/750.03; 395/309; 395/750.02; 364/240.2; 364/240.7; 364/273.1; 364/280.2; 364/DIG. 1
[58] Field of Search ..................................... 395/750, 309, 395/800; 364/240.2, 240.7, 273.1, 280.2, DIG. 1

[56] References Cited

U.S. PATENT DOCUMENTS

| | | | |
|---|---|---|---|
| 3,535,560 | 10/1970 | Cliff. | |
| 4,051,326 | 9/1977 | Badagnani et al. | 379/96 |
| 4,259,594 | 3/1981 | Fox et al. | 307/141 |
| 4,455,627 | 6/1984 | Oritani | 395/309 |
| 4,545,030 | 10/1985 | Kitchin | 395/550 |
| 4,590,553 | 5/1986 | Noda | 364/DIG. 1 |
| 4,615,005 | 9/1986 | Maejima et al. | 395/550 |
| 4,747,041 | 5/1988 | Engel et al. | 364/DIG. 1 |
| 4,768,145 | 8/1988 | Wheelwright et al. | 395/325 |
| 4,780,843 | 10/1988 | Tietjen | 395/725 |
| 4,794,525 | 12/1988 | Pickert et al. | 364/DIG. 1 |
| 4,841,440 | 6/1989 | Yonezu et al. | 395/275 |
| 4,872,110 | 10/1989 | Smith et al. | 395/275 |
| 4,907,183 | 3/1990 | Tanaka | 364/707 |
| 5,021,950 | 6/1991 | Nishikawa | 395/325 |
| 5,025,387 | 6/1991 | Frane | 364/493 |
| 5,163,124 | 11/1992 | Yabe et al. | 395/750 |
| 5,167,024 | 11/1992 | Smith et al. | 395/375 |
| 5,218,704 | 6/1993 | Watts, Jr. et al. | 395/750 |
| 5,237,692 | 8/1993 | Raasch et al. | 395/725 |
| 5,280,589 | 1/1994 | Nakamura | 365/226 |
| 5,515,539 | 5/1996 | Ohashi et al. | 395/750 |

FOREIGN PATENT DOCUMENTS

| | | | |
|---|---|---|---|
| 0166272 | 1/1986 | European Pat. Off. . | |
| 2657977 | 8/1991 | France | G06F 1/32 |
| 2825770 | 3/1980 | Germany | G06F 1/32 |
| 4037578 | 8/1991 | Germany | G06F 1/32 |
| 58-22430 | 2/1983 | Japan | G06F 3/00 |
| 58-68286 | 4/1983 | Japan | B11C 9/06 |

OTHER PUBLICATIONS

*IBM Technical Disclosure Bulletin*, vol. 29, No. 11, Apr. 1987, "Method to Provide Low Power Standby Mode for Online Devices", 1987.

*Primary Examiner*—Alyssa H. Bowler
*Assistant Examiner*—John Harrity
*Attorney, Agent, or Firm*—Townsend and Townsend and Crew LLP

[57] ABSTRACT

Peripherals connected to an external bus is connected to a power source section through switching units, and a buffer circuit connected to an internal bus and the external bus is consisted of a separating unit. An internal memory and power consumption reducing unit for controlling the switching units and the separating unit are provided in a processing unit. After program or data is transferred and stored from external memories to the internal memory through the external bus, the power consumption reducing unit keeps a low power consumption of the external peripherals by controlling the switching units, and the internal bus of the processing unit is disconnected from the external bus by controlling the separating unit. Thus, the power consumption of overall system will be restrained from increasing.

4 Claims, 7 Drawing Sheets

APPARATUS AND METHOD FOR REDUCING POWER CONSUMPTION BY PERIPHERAL DEVICES BY CONTROLLING THE INTERCONNECTION OF POWER SUPPLIES

This is a continuation of application Ser. No. 08/511,765, filed Aug. 7, 1995, now abandoned, which is a continuation of application Ser. No. 07/822,502 filed Jan. 17, 1992, now abandoned, the disclosure of which is incorporated by reference.

BACKGROUND OF THE INVENTION

1. Field of the Invention

The present invention relates to a microcomputer system, and more particularly to a microcomputer system in which the power consumption can be reduced.

2. Description of the Prior Art

Referring to a block diagram in FIG. 7, a conventional microcomputer system will be explained.

Referring to the FIG. 7, numeral 1 represents a microcomputer system such as personal computer, control unit, and the like. The microcomputer system 1 comprises a central processing unit (hereinafter referred to as CPU) 2, a micro processing unit (hereinafter referred to as MPU) 5 consisted of the CPU 2 and a buffer circuit 4 which is connected thereto through an internal bus 3, a ROM (read only memory) 7 and a RAM (random access memory) 8 as external memories connected through the buffer circuit 4 and an external bus 6, peripherals including a data input/output unit (hereinafter referred to as I/O unit) 9 such as parallel port and serial port, a clock generator 12 connected to the MPU 5, and a clock 13 having counter and the like connected to the external bus 6.

The MPU 5, ROM 7, RAM 8, and I/O unit 9 are, for example, consisted of one-chip LSI, respectively. Those are supplied with power from a power source section through a power supply line PW. The CPU 2 drives the external bus 6 through the buffer circuit 4 so as to read out program stored in the ROM 7, to write data and user program into the RAM 8, or to read out the data and program written in the RAM 8. Also, the CPU 2 inputs and outputs data to and from external devices through the I/O unit 9.

The microcomputer system 1 has to read out programs and data from the ROM 7 and the RAM 8 in order to execute programs by means of the CPU 2. Therefore, an address value storing a program is firstly outputted to the ROM 7 or RAM 8 through the internal bus 3, buffer circuit 4 and the external bus 6. Then, the CPU 2 reads the program or the data stored in the ROM 7 or RAM 8 through the buffer circuit 4 and the internal bus 3. Next, the CPU 2 performs processings corresponding to the program and data. When the data is to be outputted to the ROM 7, RAM 8, and the I/O unit 9, it is outputted again through the internal bus 3, buffer circuit 4, and the external bus 6.

Since the conventional microcomputer system is constructed as the above description, the external bus 6 to which the ROM 7, RAM 8 and the I/O unit 9 are connected is to be always accessed, which consumes more power than needed. Further, since input/output of the data is always necessary for operating as a system, the power source of the peripherals (ROM 7, RAM 8, I/O unit 9) can not be turned off or the power can not be reduced, so that the power consumption of overall system can not be restrained from increasing.

SUMMARY OF THE INVENTION

The object of the present invention, in view of the above mentioned problems, is to provide a microcomputer system in which the power consumption of overall system can be reduced.

The microcomputer system according to the present invention has a processing unit consisting of a central processing unit and a buffer circuit which is connected to the central processing unit through an internal bus, an external bus which is connected to the buffer circuit and disposed on outside of the processing unit, peripherals such as external memories and data input/output unit connected to the external bus, and a power source section for supplying the peripherals with power, wherein the peripherals are connected to the power source section through switching means and the buffer circuit is consisted of separating means, and an internal memory connected to the internal bus and power consumption reducing means for controlling the switching means and separating means are provided in the processing unit.

The above and other objects, features, and advantages of the invention will become more apparent from the following description when taken in conjunction with the accompanying drawings.

DESCRIPTION OF THE PREFERRED EMBODIMENT

An embodiment of a microcomputer system in the present invention will be explained referring to FIG. 1 through FIG. 6. Parts which are same as or corresponding to the conventional example in FIG. 7 are provided with the same reference numbers and characters and the explanation thereof will be omitted.

Figure 1:
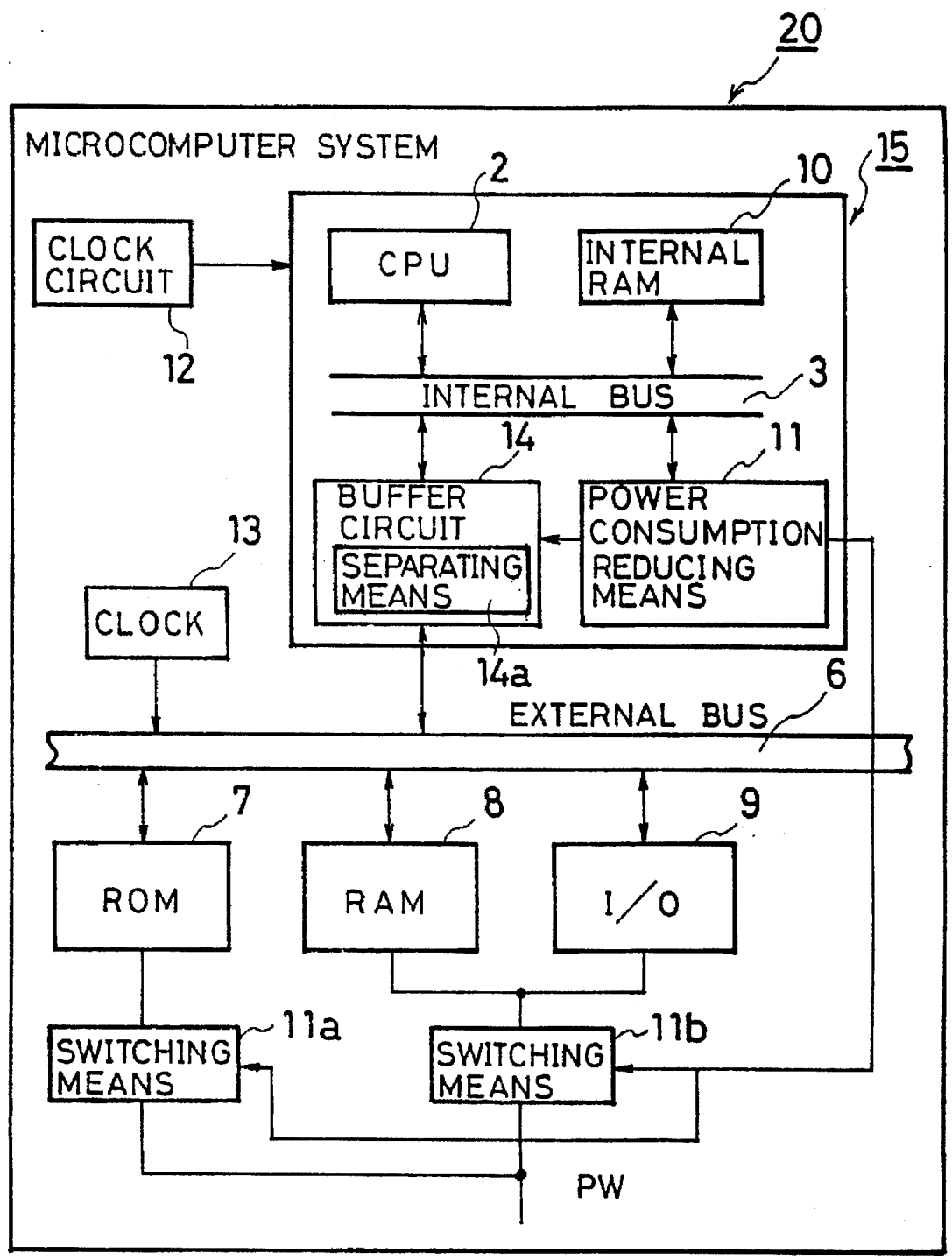
FIG. 1 is a block diagram showing an embodiment of a microcomputer system according to the present invention.

Referring to FIG. 1, a microcomputer system 20 such as of personal computer in the present invention is consisted of a MPU 15 and peripherals such as external ROM 7, RAM 8 and I/O unit 9 connected to the MPU 15 through an external bus 6.

The MPU 15 is consisted of a CPU 2, an internal RAM 10 as an internal memory, power consumption reducing means 11, and a buffer circuit 14, connected to the CPU 2 through an internal bus 3, constructed as an integral LSI chip. The MPU 15 is connected to an external bus 6 outside of the LSI chip through the buffer circuit 14.

Figure 2:
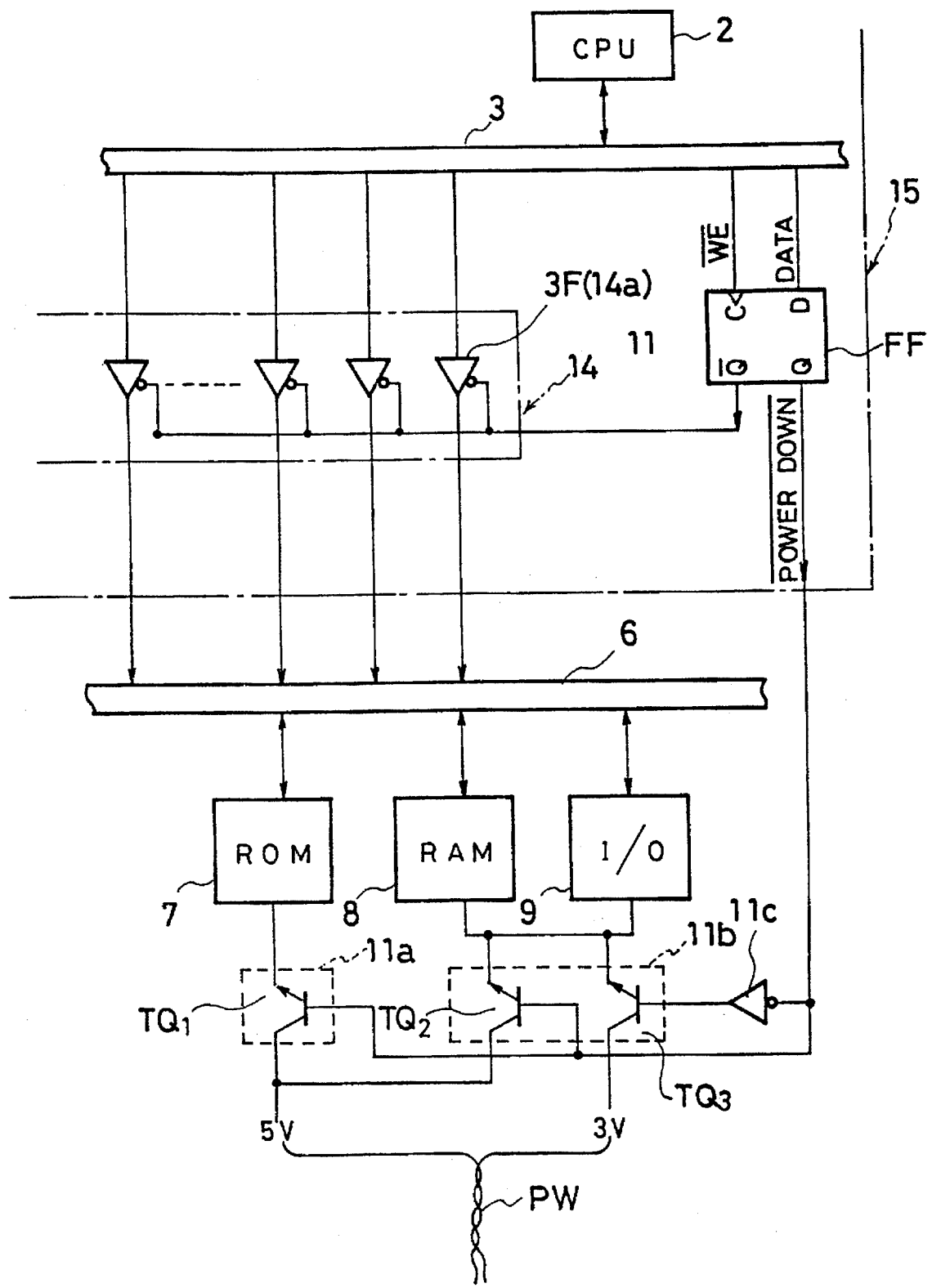
FIG. 2 is a detailed circuit diagram of a buffer circuit, power consumption reducing means and switching means in the embodiment of the microcomputer system according to the present invention.

The peripherals (external ROM 7, RAM 8, I/O unit 9) are supplied with a predetermined power from a power supply line PW of a power source section through switching means 11a and 11b. On the other hand, the power consumption reducing means 11 outputs control signal to separating means 14a constructing the buffer 14 so as to control connection/disconnection of the MPU 15 and the external bus, and outputs control signal to the switching means 11a and 11b so as to control switching of the supplying power to the peripherals. The power consumption reducing means 11, as shown in FIG. 2, is consisted of flip-flop FF as an internal register. The buffer circuit 14 is consisted of a plurality of three-state buffers 3F as separating means 14a. The switching means 11a is consisted of a switching transistor $TQ_1$, and the switching means 11b is consisted of switching transistors $TQ_2$ and $TQ_3$.

Each control gate of the separating means 14a, i.e., each three-state buffers 3F of the buffer circuit 14 is connected to an inverse output Q of the flip-flop FF. In FIG. 2, data flows from the internal bus 3 to the external bus 6. The output Q of the power consumption reducing means 11, i.e., of the flip-flop FF is connected in parallel to the base of the transistors $TQ_1$ and $TQ_2$ as a power down signal, and further, connected to the base of the transistor $TQ_3$ through an inverter 11c of negative logic. Here, collectors of the transistors $TQ_1$ and $TQ_2$ are supplied with power 5 V and collector of the transistor $TQ_3$ is supplied with power 3 V. An emitter of the transistor $TQ_1$ is connected in parallel to the power input side of the external RAM 7 and emitters of the transistor $TQ_2$ and the transistor $TQ_3$ are connected in parallel to the power input side of the external RAM 8 and the I/O unit 9.

Figure 4:
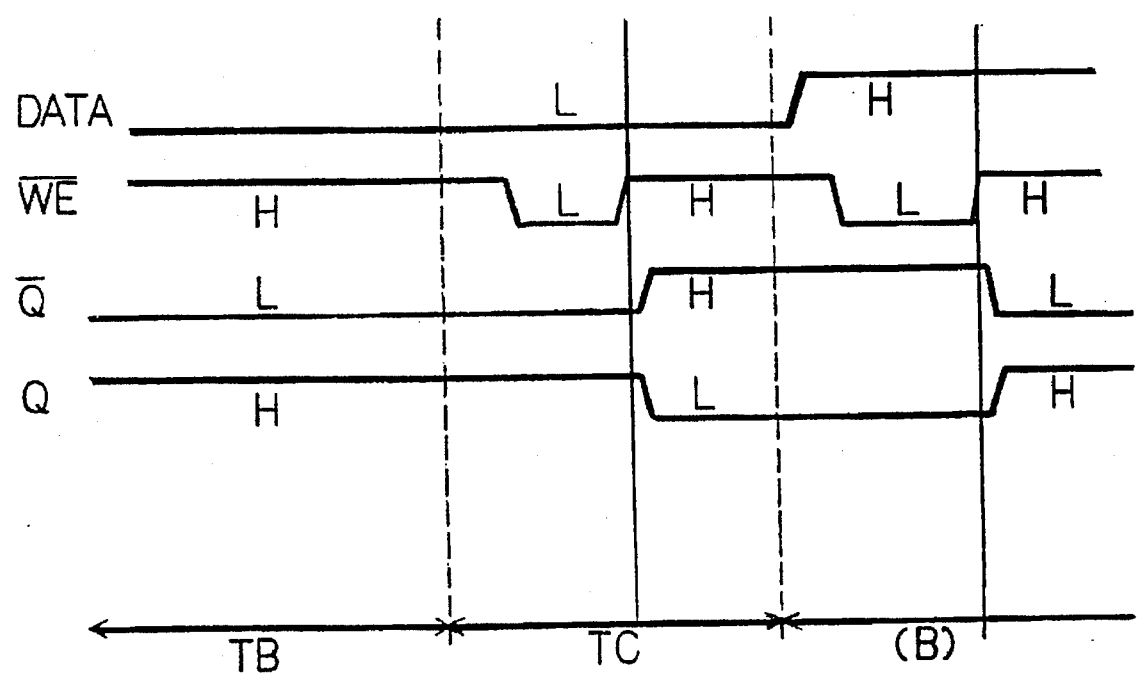
FIG. 4 is a diagram showing timing of input/output signal of the power comsumption reducing means of the embodiment of the microcomputer system according to the present invention.

Also, input D and input C of the flip-flop FF are supplied with data signal and low active WE (write enable) signal from the CPU 2 through the internal bus 3 at a timing shown in FIG. 4.

Figure 5:
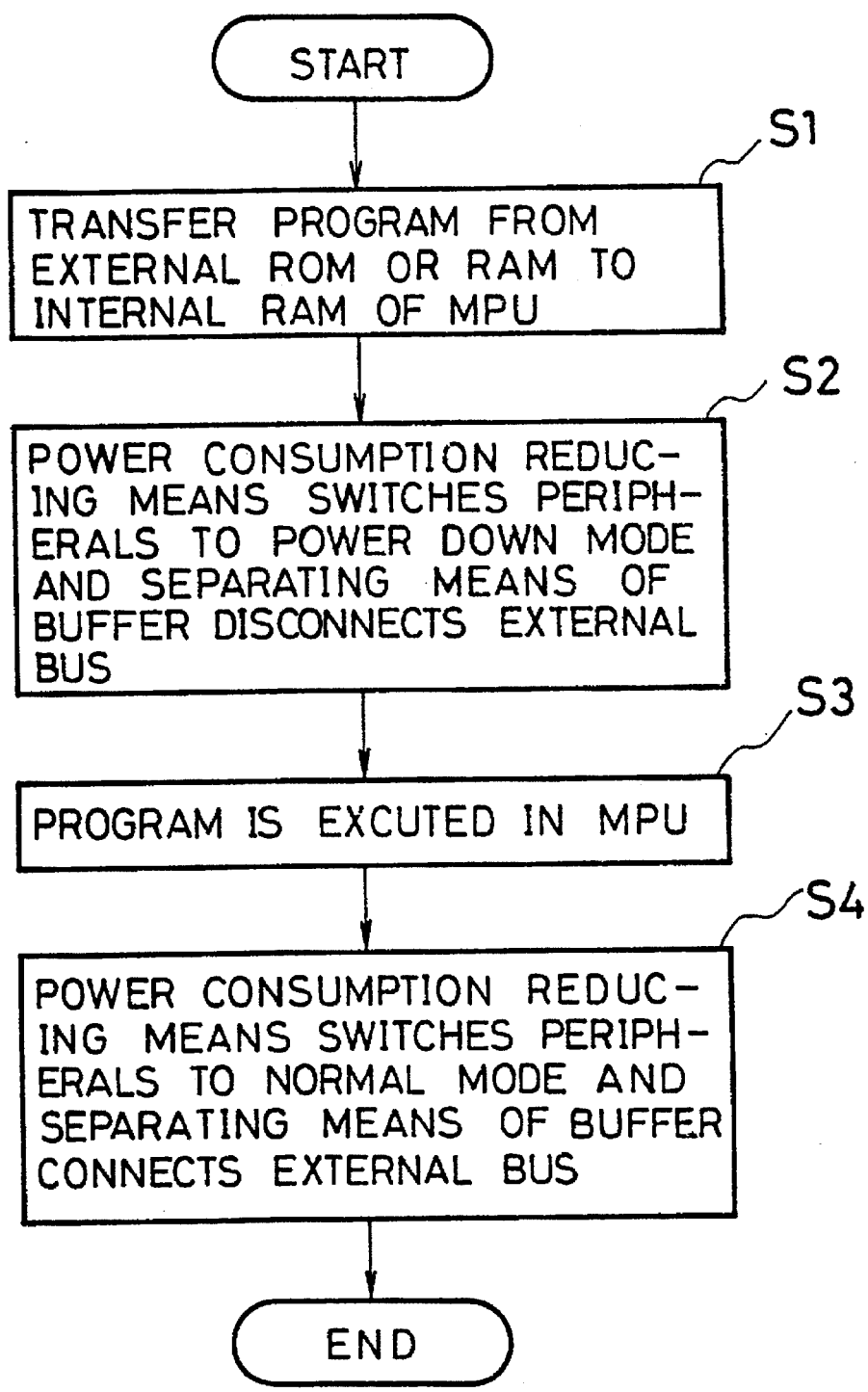
FIG. 5 is a flowchart showing an operation of the embodiment of the microcomputer system according to the present invention.

Next, the operation will be explained referring to FIGS. 3, 4, and 5.

Figure 3:
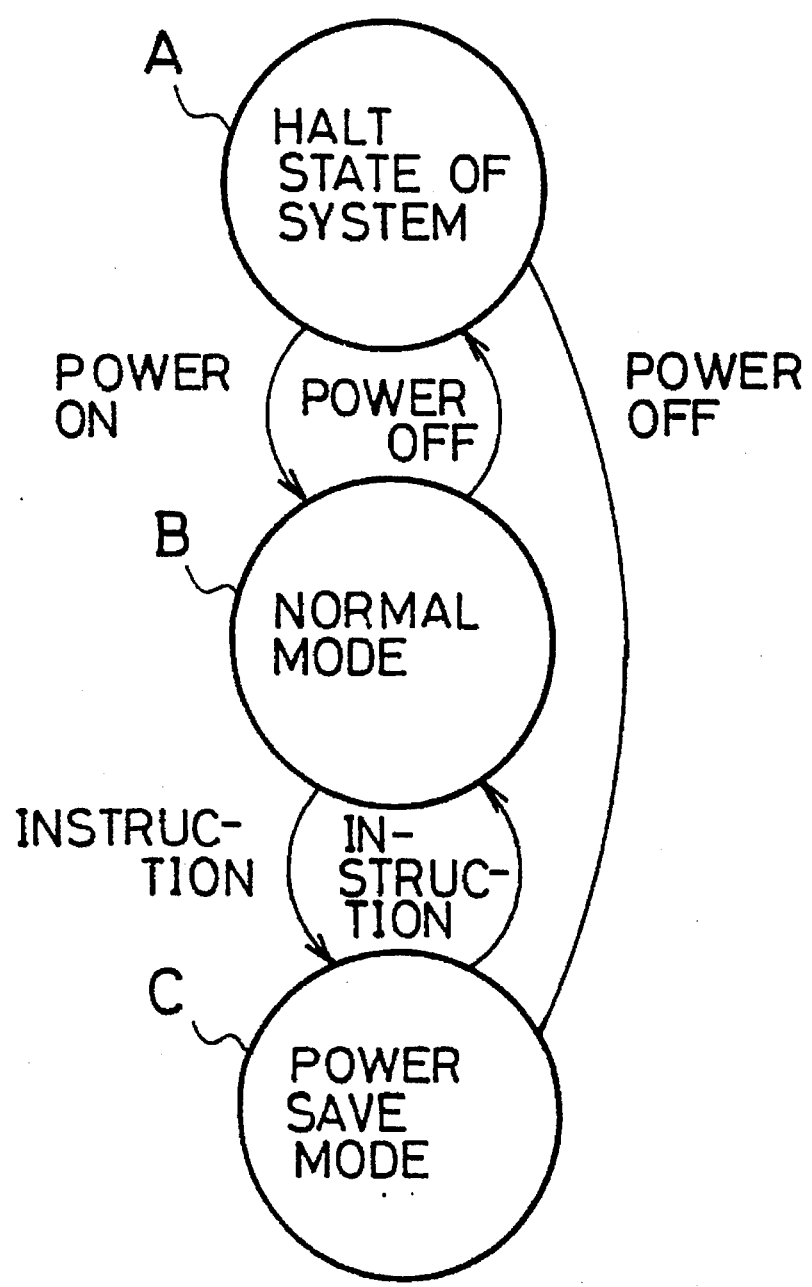
FIG. 3 is a diagram showing a state transition of the embodiment of the microcomputer system according to the present invention.

FIG. 3 is a diagram showing a state transition. At first, when the power is supplied at a halt state A of the system, a normal mode B which is an activated state of the microcomputer system 1 is established and normal processing is performed. Here, as shown in FIG. 4, the output Q of the flip-flop FF is H and the inverse output Q is L. Accordingly, each control gate of the three-state buffers 3F are charged with L, and the internal bus 3 is connected to the external bus 6. At the same time, the output Q as H signal makes the switching transistors $TQ_1$ and $TQ_2$ turned on and makes $TQ_3$ turned off. Consequently, the external ROM 7, RAM 8, and the I/O unit 9 are supplied with the high power 5 V from the power source section. In this state, the CPU 2 transfers a program which is to be executed only within the MPU 15 from the external ROM 7 or RAM 8 to the internal RAM 10 through the external bus 6, buffer circuit 14 and the internal bus 3, and stores it (step S1 in FIG. 5).

At the step S2, after the CPU 2 has confirmed a termination of the transfer of the program, the CPU 2 goes to a time TC shown in FIG. 4, and outputs the data signal L and $\overline{WE}$ signal H after L. Thus, the output Q of the flip-flop FF becomes L and the inverse output Q becomes H. Accordingly, each control gate of the three-state buffers 3F is charged with H so as to be a state of high impedance and the buffer circuit 14 is cut off. At the same time, L of the output Q is supplied to the transistors $TQ_1$ and $TQ_2$ as a low active power down signal and those are turned off. At the same time, the transistor $TQ_3$ is turned on by H signal through the inverter 11c. Accordingly, the external ROM 7, RAM 8, and the I/O unit 9 are disconnected from the power source 5 V and the low power 3 V is supplied to the RAM 8 and the I/O unit 9 through the transistor $TQ_3$. Also, the external bus 6 is disconnected from the MPU 15 by the cut of the buffer circuit 14. 3 V at this time is of a low power to such a degree that the data in the RAM 8 and the I/O unit 9 will not be deleted. At this time, the state of the system will be a power save mode C.

At the step S3, in the MPU 15, the CPU 2 reads out a program fetched in the internal RAM 10 and executes it. At this time, it is not necessary to access the external bus 6 which consumes a large quantity of power. Also, since the power of the peripherals are made to be low, the power consumption can be reduced and the power consumption of the overall system can be restrained from increasing.

At the step S3, the program to be executed terminates and when other exclusive instruction is executed or the external bus 6 is required to be accessed, the CPU 2 outputs the data signal H and $\overline{WE}$ signal H after L at the step S4 so that the inverse output Q of the flip-flop FF is made to be L and the output Q is made to be H. Thus, the buffer circuit 14 is connected to the external bus 6, and also, the transistors $TQ_1$ and $TQ_2$ are turned on so that 5 V is supplied to the peripherals, and the normal state is restored. That is, the state changes from the power save mode C to the normal mode B.

When the power is cut off in the state of power save mode C, the state changes to the system halt state A. When the power is supplied again, the system starts to operate from the normal mode B.

In the above mentioned embodiment, although the internal RAM 10 is used as an internal memory, it is not restricted to RAM. For example, if a program and data to be executed in the power save mode C are always the same, a ROM to which programs and data are previously written may be used as an internal memory instead of the internal RAM 10.

Figure 6:
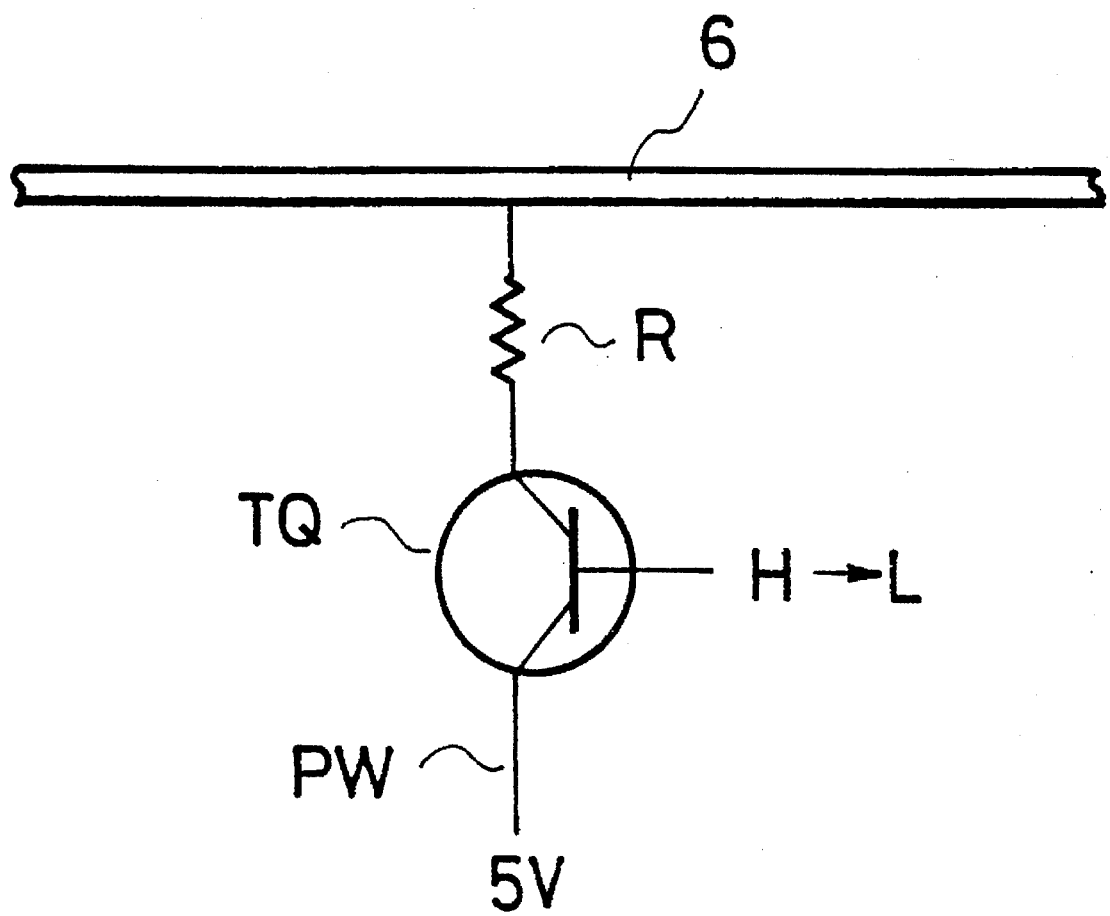
FIG. 6 is a partial circuit diagram showing other embodiment of the present invention.
Figure 7:
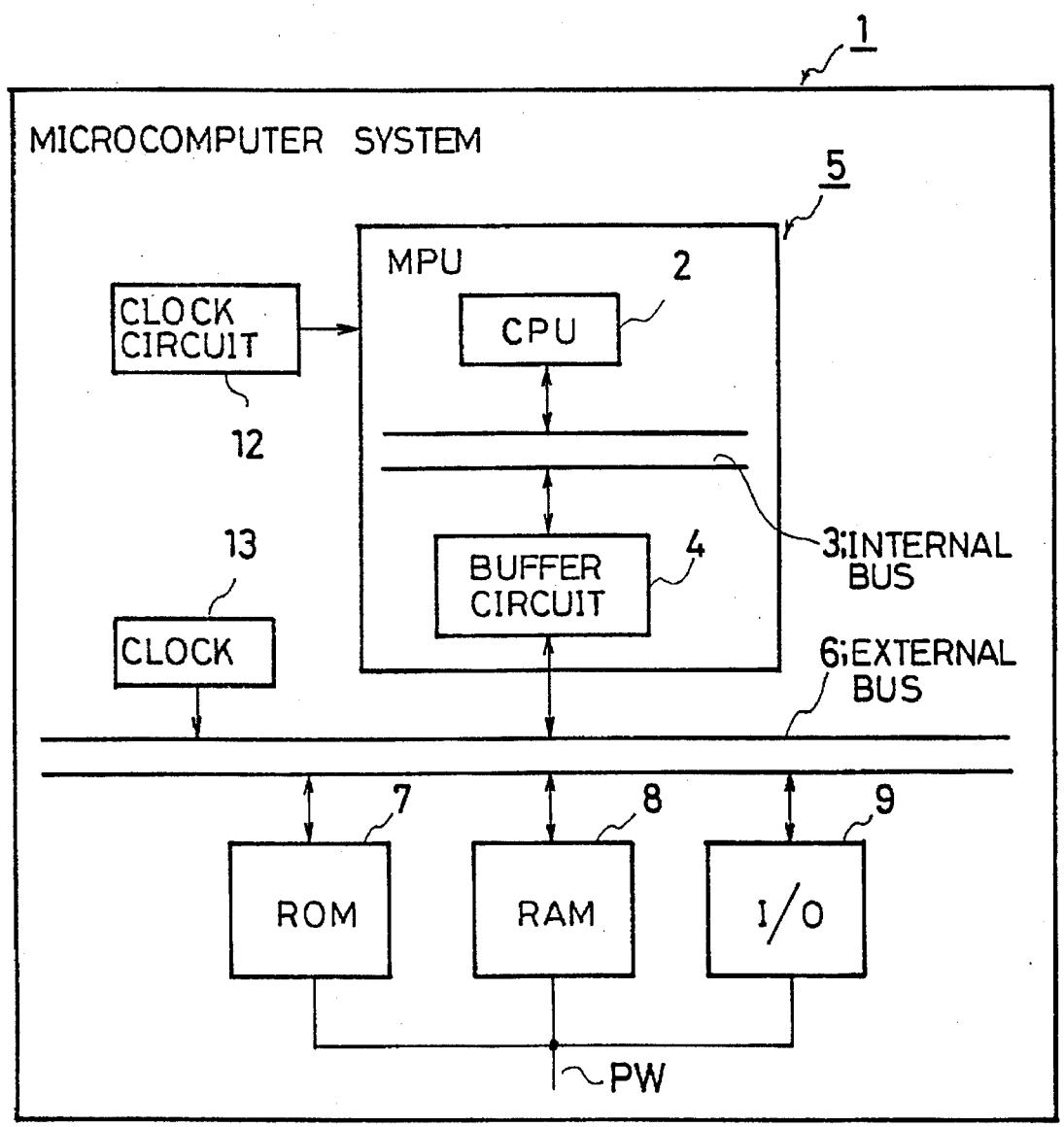
FIG. 7 is a block diagram showing a conventional example of the microcomputer system.

Also, in the above mentioned embodiment, although the structure of the external bus 6 has not been explained specifically, when the external bus 6 is pulled up by a resistance R and others and is in a high power as shown in FIG. 6, for example, the transistor TQ is used and it is turned off, and the power of the power source line PW connected to the resistance R is necessary to be reduced.

In addition, the power consumption reducing means 11 may be constructed by latch circuit as an internal resistor in the MPU 15, and the separating means of the buffer circuit 14 may be constructed by bi-directional three-state buffers.

As described above, the microcomputer system of the present invention can be operated with only the processing unit by separating the buffer circuit from the external bus with the switching means after the program or data is transferred and stored from the external memory to the internal memory provided in the processing unit. Also, by disconnecting the buffer circuit from the external bus, the external bus is not necessary to be accessed, so that the power consumption can be reduced. Further, at the same time that the external bus is disconnected, the power consumption of the input power of the peripherals can be reduced by the power consumption reducing means, so that the power consumption of overall system can be restrained from increasing.

What is claimed is:

1. A microcomputer system comprising a multiprocessing unit having a central processing unit, an internal memory (RAM) and a buffer circuit coupled to the central processing unit by an internal bus; an external bus coupled to the buffer circuit; a plurality of peripherals coupled to the external bus including external memories and an input/output unit; a first power supply for supplying power to the plurality of peripherals; and a second power supply for supplying power to the plurality of peripherals, the microcomputer system further comprising:

a separating circuit, provided within the buffer circuit, coupled to the external bus and to the internal bus, for coupling the external bus to the internal bus in response to an assertion of an output signal, and for decoupling the external bus from the internal bus in response to a deassertion of said output signal;

switching circuit, provided between the plurality of peripherals and the first and the second power supplies, coupled to the plurality of peripherals, to the first and second power supplies, and to the internal bus, for coupling the plurality of peripherals to the first power supply and decoupling the plurality of peripherals from the second power supply simultaneously with the coupling of the external bus to the internal bus, in response to said assertion of said output signal, and for decoupling the plurality of peripherals from the first power supply and for coupling the plurality of peripheral to the second power supply simultaneously with the decoupling of the external bus from the internal bus, in response to said deassertion of said output signal; and power consumption reduction circuit, provided within the multiprocessing unit, coupled to the internal bus, for asserting said output signal in response to a first instruction from the central processing unit, and for deasserting said output signal in response to a second instruction from the central processing unit.

2. In a microcomputer system including a microprocessing unit coupled to an external bus, a method for reducing input power consumption of peripheral devices coupled to the external bus, comprising the steps of:

storing a program read from one of the peripheral devices into an internal memory of the microprocessing unit;

through control of a processor of the microprocessing unit, simultaneously switching power supplied to the peripheral devices to a low power consumption voltage and decoupling the external bus from the microprocessing unit;

executing said program within the microprocessing unit; and switching power supplied to the peripheral devices from said low power consumption voltage and coupling the external bus to the microprocessing unit.

3. A microcomputer system comprising a processor including a central processor unit and of an internal memory device coupled to an internal bus, an external bus coupled to said internal bus through a buffer circuit, and a plurality of peripherals including external memory devices and data input/output units coupled to said external bus wherein, said buffer circuits including of a plurality of buffer elements each of which comprises a control electrode for switching a path, for data flow directed to said external bus from said internal bus, to be coupled or to be uncoupled, said microcomputer system further comprises:

a switching means having a first switching means and a second switching means between each of said peripherals and a power supply, wherein said first switching means is controlled to supply a first voltage to said peripherals and said second switching means is controlled to supply a second voltage, which is higher than said first voltage, to said peripherals, a power consumption reducing circuit coupled to said internal bus, to each of said control electrode provided in each of said buffer elements and to said first and second switching means, and operated by a control signal supplied from said central processor unit through said internal bus, the power consumption reducing circuit for simultaneously outputting a signal for disconnecting the data path from each of said control electrode provided in said buffer elements and outputting a signal to engage said first switching means to be turned "on" and said second switching means to be turned "off".

4. In a microcomputer system including a microprocessing unit coupled to an external bus, a method for reducing input power consumption of periphery devices coupled to the external bus, the microprocessing unit comprising a control processor unit and of an internal memory device coupled to an internal bus, an external bus coupled to said internal bus through a buffer circuit, said buffer circuit comprising a plurality of buffer elements each of which comprises a control electrode for switching a data path, for data flow directed to said external bus from said internal bus to be coupled or to be uncoupled, and a plurality of peripherals including external memory devices and data input/output units coupled to said external bus, the method comprising the steps of:

storing a program read from one of the plurality of peripherals into said internal memory device of the microprocessing unit; thereafter through control of the control processor unit, simultaneously switching a first switching means of a switching means, coupled between each of said plurality of peripheral devices and a power supply, "on", the power supply having a first voltage, switching a second switching means of said switching means, coupled between each of said plurality of peripheral devices and a second power supply, "off", the second power supply having a second voltage higher than the first voltage, and decoupling said data paths between said internal bus and said external bus;

executing said program within said microprocessing unit; and thereafter simultaneously switching said first switching means "off" and said second switching means "on", and coupling said data paths between said internal bus and said external bus.

* * * * *